June 11, 1968 D. R. JOHNSON ET AL 3,388,221

TRANSVERSE-SCAN MAGNETIC TAPE APPARATUS WITH SHIFTABLE GUIDE MEANS

Filed June 23, 1965 2 Sheets-Sheet 1

DELMAR R. JOHNSON
RICHARD A. WOLTER
INVENTORS

BY Anderson, Luedeka, Fitch, Even & Tabin
ATTORNEYS

DELMAR R. JOHNSON
RICHARD A. WOLTER
INVENTORS

BY Anderson, Luedeka, Fitch, Even & Tabin
ATTORNEYS

United States Patent Office 3,388,221
Patented June 11, 1968

3,388,221
TRANSVERSE-SCAN MAGNETIC TAPE APPARATUS WITH SHIFTABLE GUIDE MEANS

Delmar Ronald Johnson, Des Plaines, and Richard Arthur Wolter, Wheaton, Ill., assignors to Ampex Corporation, Redwood City, Calif., a corporation of California Filed June 23, 1965, Ser. No. 466,378
16 Claims. (Cl. 179—100.2)

This invention relates to magnetic tape recording or reproducing apparatus, and more particularly to a tape transport for use in magnetic tape recording or reproducing apparatus.

A tape tansport for use in magnetic tape recording or reproducing apparatus generally includes a pair of rotatable turntables for the supply and takeup reels which store the magnetic tape. The tape is guided between the supply and takeup reels by an arrangement of guides and/or idlers and over a scanning assembly. A rotating capstan operates to drive the tape at a predetermined speed between the supply and takeup reels. The scanning assembly generally includes one or more transducing heads which operate to translate electrical signals to magnetic variations for storage on the tape during the record operation, or which operate to translate magnetic signals from the tape into electrical signals during the reproduce operation.

In the recording of relatively broad frequency band signals on magnetic tape and the subsequent reproduction of the signals from the tape, helical wrap scanning of the tape may be employed to increase the density of signal on the tape. This is desirable, for example, in the recording and playback of television signals inasmuch as an entire field, or in some instances an entire frame, may be included in a single relatively long track recorded on the tape. This eliminates various switching and synchronization problems formerly encountered in combining a relatively large number of tracks to reproduce a single frame. A description of helical wrap scanning apparatus and a discussion of the advantages thereof are included in U.S. Patent No. 2,998,495, which issued Aug. 29, 1961. Basically, such apparatus includes a pair of cylindrical drums which are axially spaced to define an annular gap therebetween. Magnetic tape is wrapped helically about the drums and is moved over the drums in the direction of its length between tape supply and takeup reels by a driving capstan. One or more transducer heads mounted on one of the drums near the gap between the drums rotates with the drum on which it is mounted and sweeps a rectilinear area of tape, such rectilinear area extending at an acute angle across the tape. As a result, relatively long tracks are spaced successively along the tape and extend at acute angles to the edges thereof.

It has been found that a scanning assembly wrap wherein the tape is wrapped substantially 360° in helical fashion about the scanning assembly provides certain advantages. One of the major advantages provided by such a wrap is the fact that only a single transducing head need be utilized. In one type of 360° wrap, known as the "Omega" wrap, the tape approaches and leaves the surface of the scanning assembly at approximately the same point and forms, accordingly, a rough approximation of the Greek letter capital Omega. The Omega type wrap is not a full 360° but, by proper circuit design and other compensations, the effect of the slight dropout space between the approaching and leaving paths of the tape are negligible. The previously referenced Patent No. 2,998,495, illustrates an Omega type wrap transport.

One problem with the Omega type wrap is in the threading of the tape on the transport. The peculiar shape of the tape path and the necessity for the entry and exit guides to be very close to each other and to the exterior surface of the scanning assembly may make threading of the tape about the scanning assembly quite difficult. The construction of movable guides or other movable parts is complicated by the fact that the location and positioning of the various guides and other parts must be extremely precise in order, among other things, to minimize the dropout space and to make it the same each time for consistent and full reproduction.

It is an object of this invention to provide an improved tape transport for magnetic tape recording or reproducing apparatus.

It is a further object of the invention to provide a tape transport utilizing a scanning assembly with an Omega wrap, which transport is so designed as to facilitate threading of the tape around the scanning assembly.

Still another object of the invention is to provide a system of movable guides for an Omega wrap scanning assembly and means for accurately locating the guides in operative position.

A still further object of the invention is to provide means for locating and positioning movable guides for an Omega wrap scanning assembly, which means are simple and reliable.

The foregoing objects are accomplished by constructing a tape transport in accordance with the invention. The transport includes a supply and takeup arrangement for the magnetic tape, and a scanning assembly about which the tape follows a substantially 360° path to define an Omega type wrap. The scanning assembly records information on the magnetic tape or reproduces information from the magnetic tape. Guides are provided for guiding the tape about the scanning assembly and a rotatable driving capstan is provided for moving the tape around the scanning assembly. The guides may include a pair of cones for imparting a twist to the tape as it approaches and leaves the scanning assembly to guide the tape in the helical wrap. The guides further include a pair of entry an dexit guides adjacent each other and the cone in the operating position for guiding the tape in the Omega type wrap. The entry and exit guides and the cones are positioned to have the tape pass between them.

The guides are mounted on a pair of pivotally mounted arms, and a manual control is provided for pivoting the arms to move the guides away from each other and from the scanning assembly to facilitate threading of the tape around the scanning assembly. In order to locate the guides accurately in their operating positions, a reference surface is provided against which the pivot arms are biased when in such operative position. The bias may be provided by a stop having an inclined surface to wedge each of the arms against the reference surface. A pair of members, which may be two of the guides, one on each arm, engage each other in the operative position to impart a moment to each arm to ensure that the arms are held securely against the reference surface.

The details of the invention and further objects thereof will be apparent from the accompanying drawings wherein.

Figure 2A:
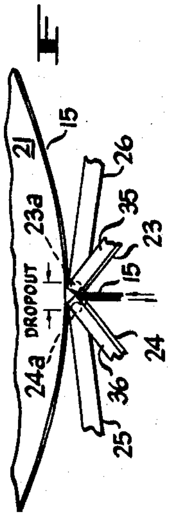
FIGURE 2 is a top plan view of the tape transport of the apparatus of FIGURE 1 illustrating the operating position.
Figure 2:
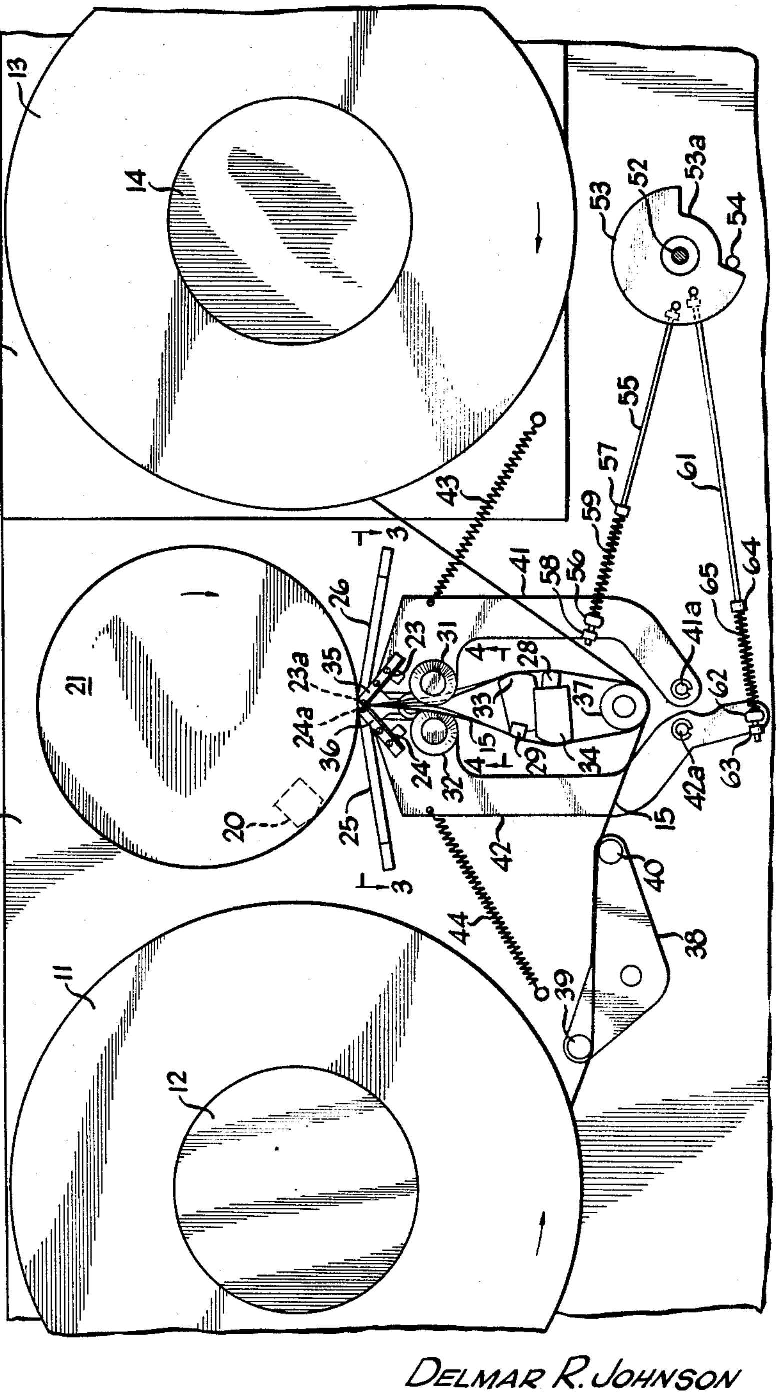
Figures 3, 4, 5:
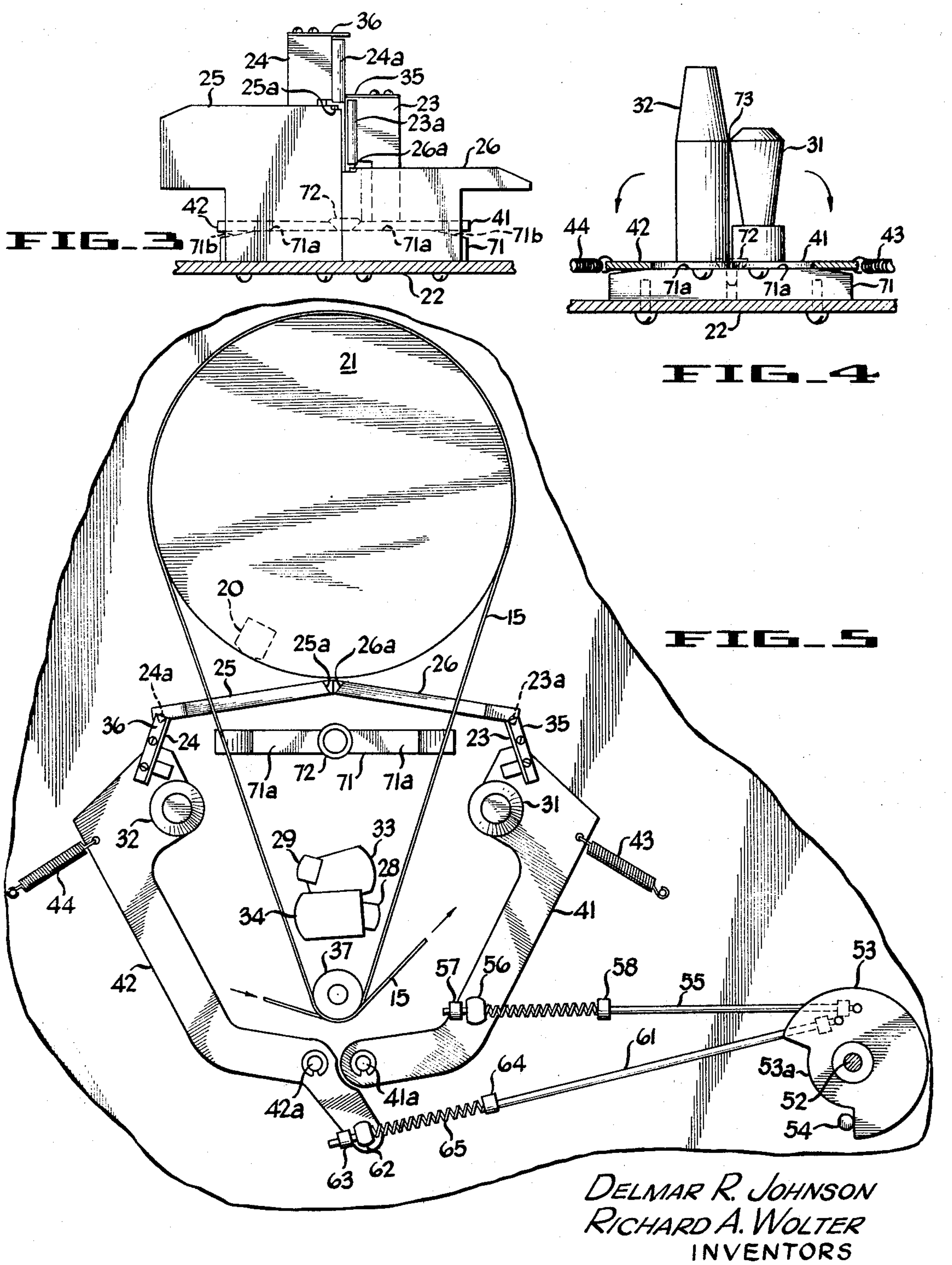

FIGURE 2*a* is an enlarged plan view of a portion of the transport of FIGURE 2;

FIGURE 3 is an enlarged sectional view taken along the line 3—3 of FIGURE 2 without showing the magnetic tape;

FIGURE 4 is an enlarged sectional view taken along the line 4—4 of FIGURE 2 without showing the magnetic tape; and, FIGURE 5 is an enlarged plan view of a portion of the tape transport of FIGURE 2 illustrating the threading position.

Figure 1:
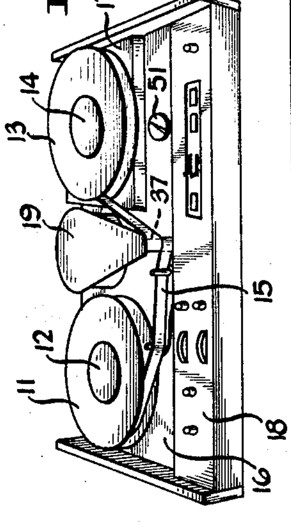
FIGURE 1 is a perspective view on a reduced scale of magnetic tape recording and reproducing apparatus incorporating the invention.

Referring now to FIGURE 1, magnetic tape recording and reproducing apparatus incorporating the invention is shown in perspective view. The apparatus includes a supply reel 11 carried on a supply reel turntable 12 and a takeup reel 13 carried on a takeup reel turntable 14. Magnetic tape 15 passes from the supply reel 11 to the takeup reel 13 over various guides, a scanning assembly, and a driving capstan, all of which are shown in the subsequent figures and are described in detail below. The tape deck upon which these latter items are mounted is covered by a panel or escutcheon 16 with suitable openings therein. A further panel 19 covers the guides, capstan and scanning assembly. Takeup reel 13 is mounted on a raised structure 17 to be disposed in a plane parallel to but above the plane of supply reel 11 for purposes to be subsequently described. The front of the apparatus includes a control panel 18 upon which are disposed a plurality of suitable controls and indicators for operating the apparatus.

A helical wrap scanning assembly 21 is mounted on deck 22 as illustrated in FIGURE 2. FIGURE 2 shows the tape transport as it appears with the panel 16 removed and with the further cover panel 19, which covers the guides and scanning assembly, also removed. Scanning assembly 21 contains a movable transducing head 20 which contacts the tape as it rotates about the periphery of scanning assembly 21 in a direction opposite to the tape travel. The scanning assembly 21 is called a helical wrap scanning assembly because, as the tape passes 360° around the periphery of the scanning assembly 21, it describes a helical path. The supply and takeup reels are on different levels to accommodate this helical wrap.

In order for the tape to follow a helical path and extend close to 360° around the periphery of scanning assembly 21 in an Omega type wrap, a guide system is provided. The guide system includes an entry guide 23 having a guide surface 23*a* thereon and an exit guide 24 having a guide surface 24*a* thereon (FIGURE 3). The guide surface may be a portion of a cylinder which is cemented to the guide for support. Surface 23*a* is disposed at the level of the tape path coming off of reel 11 and surface 24*a* is disposed at the level of the tape path going on to reel 13. Each of the surfaces is disposed to direct the tape entering upon and leaving the periphery of scanning assembly 21. In order to assure that the tape will be guided on to the scanning assembly 21 at the correct height and taken off at the correct height, fixed lower edge guides 25 and 26 are provided. Lower edge guides 25 and 26 have small inclined notches 25*a* and 26*a*, respectively (see FIGURES 3 and 5), cut in the inner corners adjacent the scanning assembly 21 to provide lower edge guide surfaces essentially parallel to the helical path of the tape entering and leaving the scanning assembly 21. The entrance and exit guides 23 and 24 are offset in order to extend over these fixed edge guides 25 and 26. Upper edge guides comprising a pair of flat spring arms 35 and 36, one on top of each guide 23 and 24 serve to urge the tape down into proper position on surfaces 23*a* and 24*a*.

In order to effect a helical path in the tape between the level of the supply reel 11 and the level of the takeup reel 13, it is necessary that the tape be twisted before entering upon scanning assembly 21 and twisted again after leaving scanning assembly 21. This is accomplished by means of entry guide cone 31 and exit guide cone 32. Cones 31 and 32 are disposed adjacent to the entry and exit guides 23 and 24. Tape approaching the scanning assembly 21 on the level of supply reel 11 is given a slight twist by cone 31 in order that it rise helically about the periphery of scanning assembly 21. To prevent the tape from continuing to rise after leaving scanning assembly 21, exit cone 32 twists the tape again in order to return it to a path which is substantially parallel with the plane of deck 22. In both approaching and leaving scanning assembly 21, the tape passes between cones 31 and 32. A control track transducing head 33 engages the tape 15 as it approaches scanning assembly 21 and an audio transducing head 34 engages the tape as it leaves scanning assembly 21. Transducing heads 33 and 34 are positioned between the approaching and leaving tape paths. Transducing heads 33 and 34 are mounted adjacent erase heads 28 and 29, respectively. The erase head 29 and transducer 33 determine the tape path as it approaches and leaves cones 31 and 32, and hence determine the angle of wrap about the cones.

For accurate recording and reproduction, it is necessary that the tape move over the scanning assembly 21 in a constant and regular manner. In order to provide such constant and smooth driving of the tape, the driving capstan 37 is positioned to engage and drive the tape prior to its entry upon scanning assembly 21 and subsequent to its exit from scanning assembly 21. Capstan 37 is made long enough for at least two widths of the tape 15 to accomplish such driving contact. The angle of wrap of tape 15 about capstan 37 is such as to cooperate with the tape tension and the coefficient of friction and make it unnecessary to utilize pinch rollers or other similar means for holding the tape 15 against the outer surface of capstan 37. The tape passes from the supply reel around the capstan, through the guide system, around scanning assembly 21, back through the guide system and once more around capstan 37. The capstan is rotatable in the same direction as the direction of tape travel and is positioned with respect to the guide system and scanning assembly such that the tape is wrapped in a loop around the scanning assembly and the capstan. This loop need not necessarily be a single loop as shown but might take other configurations such as, for example, a figure eight with each loop of the eight around a respective one of the capstan and scanning assembly. A pivotally mounted tape tension lever 38, having guides 39 and 40 over which the tape passes, may be positioned between the supply reel 11 and the capstan 37 in order to provide regulated tension on the tape.

To provide a substantially 360° Omega type helical wrap of tape about scanning assembly 21, it is necessary that entry and exit guides 23 and 24 be disposed close to each other and to the periphery of scanning assembly 21. This is so that the dropout, that is, that portion of the 360° wrap which is not completed (see FIGURE 2*a*), is minimized. The close spacing of guides 23 and 24 and scanning assembly 21 would make threading of the tape upon the transport difficult for a person using the apparatus. To alleviate this problem, guides 23 and 24 and guide cones 31 and 32 are mounted on a pair of arms 41 and 42 near the ends thereof proximate scanning assembly 21. Arm 41 is pivotally mounted on a pivot post 41*a* extending from deck 22, and arm 42 is pivotally mounted on a pivot post 42*a* extending from the deck 22. Both pivot posts are located proximate each other and the capstan for convenience in construction, however, other locations are possible within the scope of this invention. Arm 41 is biased in a clockwise direction about pivot post 41*a* by a tension spring 43. Similarly, arm 42 is biased in a counter-clockwise direction about pivot post 42*a* by a tension spring 44. The arms are pivotal from the position shown in FIGURE 2 to the position shown in FIGURE 5. This moves the guides 23 and 24 and the cones 31 and 32 away from each other and from the scanning assembly 21 to a position outside of a pair of tangent lines drawn between capstan 57 and scanning assembly 21. These tangent lines coincide with the tape path during threading, and thus it is sufficient to thread the tape around capstan and scanning assembly in a loop, as illustrated in FIGURE 5. When the arms are returned to the position of FIGURE 2, the tape is moved into operating position. Because the guides and guide cones are disposed on the outside of the approaching and leaving tape paths, and because the transducing heads are located between the approaching and leaving tape paths, the tape may be easily threaded and readily resumes its operative path when the arms are moved to operating position.

Control over the pivoting of the arms 41 and 42 for tape threading is afforded by a control knob 51 on cover panel 16. Control knob 51 is keyed to a shaft 52 journaled in the deck 22 and to which is keyed a disc 53. A cut-out segment 53*a* is provided in disc 53 and a stop post 54 extends upwardly in segment 53*a* to engage the disc 53 at each end of segment 53*a* and limit the angular displacement of the disc. A rod 55 is pivotally secured at one end to disc 53 and is slidably secured in a bushing 56 on arm 41. Bushing 56 is pivotal with respect to the arm 41 about an axis perpendicular to the arm. A pair of stops 57 and 58 are provided on rod 55 and a compression spring 59 is disposed between stop 51 and bushing 56. A similar arrangement is provided for a rod 61 which is pivotally secured at one end to disc 53 and is slidably secured to a pivotal bushing 62 in arm 42. A rod 61 is provided with stops 63 and 64 and a compression spring 65 is disposed between stop 64 and pivotal bushing 62.

It will be seen by comparing FIGURES 2 and 5 that rods 55 and 61, by their connections to the respective arms 41 and 42, provide an over-center action on disc 53. This over-center action will bias disc 53 against stop 54 with the arms either in the operating position as shown in FIGURE 2 or in the thread position as shown in FIGURE 5. In order to move the guides and guide cones from the operative position shown in FIGURE 2 to the position shown in FIGURE 5 for threading, the control knob is turned in a clockwise direction. After sufficient turning, the force exerted by springs 65 and 59 through rods 61 and 55 on disc 53 is exerted on the opposite side of the axis of rotation of the disc. The bias of springs 65 and 59 and springs 43 and 44 will then force rotation of disc 53 until stop 54 engages the opposite end of segment 53*a*. When this occurs, the position shown in FIGURE 5 is assumed. After the tape is threaded, the guides and guide cones may be returned to their operative position by turning knob 51 counter-clockwise until rods 55 and 61 are returned to the first side of the axis of disc rotation. Disc 53 will then be biased against stop 54 in the position shown in FIGURE 2 and the transport will be ready for operation. By the foregoing construction, a simple control is provided for moving the arms from the operative position to the thread position and vice versa. Such construction facilitates threading of the tape through the various guides and over the scanning assembly 21. The lower edge guides 25 and 26 do not move but are fixed to the deck 22 to provide accurate guiding of the tape. It may be found that only one of springs 43 and 44 is necessary to bias both arms toward the thread position. This is because the force of the one spring will act through the rods and discs 53 to the opposite arm.

Because it is extremely important that the tape pass about scanning assembly 21 in a precise path, it is necessary that the guide cones 31 and 32 and the guides 23 and 24 be accurately positioned with respect to scanning assembly 21. Where the guides and guide cones are permanently fixed in their position, accurate positioning presents no particularly great problem. When, however, as in accordance with this invention the guides are mounted on movable arms, provision must be made for accurately locating the guides when they are in the operative position shown in FIGURE 2 such that they assume the same position each time. To achieve this, a bearing member 71 is secured to the deck 22 and has a reference surface 71*a* thereon between two sloping surfaces 71*b* and 71*c*. Surface 71*a* is machined to a predetermined height and the undersides of arms 41 and 42 are precisely machined such that the conical guides 31 and 32 and the entry and exit guides 23 and 24 will be supported in a precisely exact position with respect to each other and scanning assembly 21. In order to hold the undersides of arms 41 and 42 firmly against reference surface 71*a*, a stop member 72 is provided extending upwardly from reference surface 71*a*. Stop member 72 is in the shape of an inverted cone and the edges of arms 41 and 42 are machined to mate with the conical surface of stop member 72. Thus, when arms 41 and 42 are in the position shown in FIGURE 2, stop member 72 will force the edges of the arm engaging it down against reference surface 71*a* to locate the various guides.

It might occur that the downward force exerted by stop 71 on the adjacent edges of arms 41 and 42 will cause the undersides to lift off the reference surface 71*a*. In order to prevent this, guide cones 31 and 32 are mounted on the arms such that they will just engage at their maximum periphery point 73 when the arms are in the operative position shown in FIGURE 2. This imparts a moment, indicated in FIGURE 4 by the arrows, to each of arms 41 and 42. This moment is directed such that it forces the undersides of the arms down against the reference surface 71*a* and prevents the arms from lifting off of the reference surface due to the wedging action of stop 72. Alternatively, other projections rather than cones 31 and 32 might be specially constructed and provided on the arms to engage and produce the desired moments. Thus, the arrangement, although relatively simple, provides a firm and secure positioning of the arms and hence of the guides supported by the arms, which positioning is achieved upon each repeated operation.

It may therefore be seen that the invention provides an improved tape transport of simple construction for use in magnetic tape recording and reproducing apparatus. The transport incorporates an Omega wrap scanning assembly and utilizes guides which are movable by a simple mechanism to facilitate threading. The guides are accurately located each time they are returned to the operative position. Other forms of the invention will be apparent, to those skilled in the art, from the foregoing specification and the appendant claims.

What is claimed is:

1. A tape transport for use in magnetic tape recording or reproducing apparatus, including in combination, a scanning assembly for recording information on magnetic tape or for reproducing information from magnetic tape, means for supplying magnetic tape to said scanning assembly and for taking up magnetic tape from said scanning assembly, an entry guide and an exit guide positionable adjacent each other and said scanning assembly in an operating position for guiding the tape about said scanning assembly in an Omega type wrap, a rotatable capstan positioned with respect to said guides and said scanning assembly to effect driving contact with the tape prior to entry upon and subsequent to exit from said scanning assembly with the tape passing in a loop about said scanning assembly and said capstan, and means for moving said entry and exit guides away from each other and said scanning assembly between the operating position and a thread position wherein each of said guides is disposed apart from each other and from said scanning assembly to facilitate threading of tape around said scanning assembly.

2. A tape transport for use in magnetic tape recording or reproducing apparatus, including in combination, a scanning assembly for recording information on magnetic tape or for reproducing information from magnetic tape, means for supplying magnetic tape to said scanning assembly and for taking up magnetic tape from said scanning assembly, a pair of arms pivotal between operating and thread position, a guide secured to each of said arms, each of said guides being disposed adjacent the other and said scanning assembly in the operating position for guiding the tape about said scanning assembly in an Omega type wrap, a driving capstan positioned with respect to said guides and said scanning assembly to effect driving contact with the tape prior to entry upon and subsequent to exit from said scanning assembly with the tape passing in a loop around said scanning assembly and said capstan, and means for pivoting said arms away from each other and said scanning assembly from the operating position to a thread position wherein said guides are positioned to facilitate threading of tape around said scanning assembly and said capstan.

3. The combination of claim 2 wherein said means for pivoting said arms comprise a manually operated pivotal actuating member and a pair of spring loaded links each pivotally connected to said actuating member and to a respective one of said arms for pivoting said arms between operating and thread positions in response to pivoting of said actuating member, and further comprise stop means for limiting the pivotal movement of said actuating member such that said spring loaded links provide over-center action for holding said arms in the operating position with said guides adjacent each other and said scanning assembly.

4. The combination of claim 3 wherein said means for pivoting said arms further comprise spring means biasing at least one of said arms toward the thread position.

5. A tape transport for use in magnetic tape recording or reproducing apparatus, including in combination, a scanning assembly for recording information on magnetic tape or for reproducing information from magnetic tape, means for supplying magnetic tape to said scanning assembly and for taking up the magnetic tape from said scanning assembly, a pair of arms pivotal between an operating position and a thread position, each having an end disposed proximate said scanning assembly, a guide secured to each of said arms at said end thereof, each of said guides being disposed adjacent the other and said scanning assembly with said arms in the operating position for guiding the tape about said scanning assembly in an Omega type wrap, a driving capstan effecting driving contact with the tape prior to enry upon and subsequent to exit from said scanning assembly with the tape passing in a loop around said scanning assembly and said capstan, and means for pivoting said arms in opposite directions between the operating position and the thread position wherein said guides are disposed away from each other and said scanning assembly and outside of a pair of tangent lines drawn between the outer peripheries of said scanning assembly and said capstan, whereby the threading of tape around said scanning assembly and said capstan is facilitated.

6. A tape transport for use in magnetic tape recording or reproducing apparatus, including in combination, a tape deck, tape supply means for supplying magnetic tape in a path parallel to said deck on a first level with respect thereto, tape takeup means for taking up the magnetic tape in a path parallel to said deck on a second level with respect thereto, a helical wrap scanning assembly for recording information on the magnetic tape or for reproducing information from the magnetic tape, a pair of arms pivotally mounted on said deck and pivotal between operating and thread positions, guide means secured to respective ones of said arms and disposed for guiding the tape about said scanning assembly in a substantially 360° helical wrap between said first and second tape path levels when said arms are in the operating position, a driving capstan positioned with respect to said guide means and said scanning assembly to effect driving contact with the tape at both the first and second levels with the tape passing in a loop around said scanning assembly and said capstan, and means for pivoting said arms in opposite directions from the operating position to move said guide means to the thread position wherein threading of tape around said scanning assembly and said capstan is facilitated.

7. A tape transport for use in magnetic tape recording or reproducing apparatus, including in combination, a tape deck, a helical wrap scanning assembly mounted on said deck for recording information on the magnetic tape or for reproducing information from the magnetic tape, tape supply and takeup means for supplying magnetic tape to said scanning assembly and for taking up magnetic tape from said scanning assembly, a pair of arms pivotally secured to said deck and displaced therefrom and being pivoted in opposite directions from an operating position to a thread position, each of said arms having a substantially flat undersurface, a pair of guides each mounted on a respective one of said arms for guiding the tape about said scanning assembly in a substantially 360° helical wrap when said arms are in the operating position, means for pivoting said arms in opposite directions for moving said guides mounted thereon from the operating position to the thread position which facilitates threading of tape around said scanning assembly, support means secured on said deck and providing a reference surface for mating with each of said undersurfaces of said pivotal arms to determine the height and angular disposition of said guides with respect to said scanning assembly, stop means extending from said reference surface and having an inclined surface thereon for engaging each of said arms in operative position to hold the portions of said undersurface of said arms which are adjacent said stop means against said reference surface, and means mounted on each of said arms and having portions thereon engageable in the operating position for imparting a moment to each of said pivotal arms, said moments being directed to force the portions of the undersurface of each of said pivotal arms which are displaced from said stop means against said reference surface.

8. The combination of claim 7 wherein said stop means comprises an inverted conical surface about an axis extending upwardly from said reference surface.

9. A tape transport for use in magnetic tape recording or reproducing apparatus, including in combination, a tape deck, a helical wrap scanning assembly mounted on said deck for recording information on the magnetic tape or for reproducing information from the magnetic tape, tape supply and takeup means for supplying magnetic tape to said scanning assembly and for taking up magnetic tape from said scanning assembly, a pair of arms pivotally secured to said deck and displaced therefrom and being pivotal in opposite directions from an operating position to a thread position, each of said arms having a substantially flat undersurface, guide means mounted on a respective one of said arms for guiding the tape about said scanning assembly in a substantially 360° helical wrap when said arms are in the operating position, means for pivoting said arms in opposite directions for moving said guide means mounted thereon from the operating position to the thread position which facilitates threading of tape around said scanning assembly, support means secured on said deck and providing a reference surface for mating with each of said undersurfaces of said pivot arms to determine the height and angular disposition of said guide means with respect to said scanning assembly, stop means extending from said reference surface and having an inclined surface thereon for engaging each of said arms in operative position to hold the portions of each of said undersurfaces of said arms which are adjacent said stop means against said reference surface, said guide means having portions thereon engageable in the operating position for imparting a moment to each of said pivotal arms, said moments being directed to force the portions of the undersurface of each of said pivotal arms which are displaced from said stop means against said reference surface.

10. The combination of claim 9 wherein said guide means include a pair of guide cones each mounted on a respective one of said pivotal arms and engageable with each other at their maximum periphery in operative position.

11. A tape transport for use in magnetic tape recording or reproducing apparatus, including in combination, an Omega wrap scanning assembly for recording information on magnetic tape or for reproducing information from magnetic tape, means for supplying magnetic tape to said scanning assembly and means for taking up magnetic tape from said scanning assembly, a pair of arms pivotally mounted on said deck and pivotal between operating and thread positions, first and second guide means mounted on respective ones of said arms, each of said guide means being disposed adjacent the other and the periphery of said scanning assembly with said arms in the operating position for guiding the tape about said scanning assembly in a substantially 360° wrap, said guide means being positioned to pass the tape therebetween as the tape approaches and leaves the scanning assembly, and means for pivoting said arms to the thread position wherein said guide means are moved away from each other and said scanning assembly to facilitate threading of tape around said scanning assembly.

12. A tape transport for use in magnetic tape recording or reproducing apparatus, including in combination, a helical wrap scanning assembly for recording information on magnetic tape or for reproducing information from the magnetic tape, means for supplying magnetic tape to said scanning assembly and for taking up magnetic tape from said scanning assembly, a first guide and a second guide positionable adjacent each other and said scanning assembly in an operating position for guiding the tape about said scanning assembly in an Omega type wrap, a rotatable capstan positioned with respect to said guide means and said scanning assembly to effect driving contact with the tape prior to entry upon and subsequent to exit from said scanning assembly with the tape passing in a loop about said scanning assembly and said capstan, a third guide and a fourth guide positionable adjacent each other between said capstan and said first and second guides, each of said third and fourth guides having an inclined surface thereon for imparting a twist to the tape to effect a helical wrap about said scanning assembly, said first, second, third, and fourth guides being positioned such that the tape passes between said first and second guides and between said third and fourth guides as it approaches and as it leaves said scanning assembly, tape engaging means positioned between said capstan and said third and fourth guides and between the tape approaching said third and fourth guides from said capstan and the tape approaching said capstan from said third and fourth guides whereby said tape engaging means determine the angle of wrap of the tape about said third and fourth guides, and means for moving said second and fourth guides away from said first and third guides and said scanning assembly between the operating position and a thread position wherein threading of tape around said scanning assembly and between said guides is facilitated.

13. The combination of claim 12 wherein said tape engaging means include transducing means for erasing a signal on the tape.

14. A tape transport for use in magnetic tape recording or reproducing apparatus, including in combination, a tape deck, tape supply means for supplying magnetic tape in a path parallel to said deck on a first level with respect thereto, tape takeup means for taking up the magnetic tape in a path parallel to said deck on a second level with respect thereto, a helical wrap scanning assembly for recording information on the magnetic tape or for reproducing information from the magnetic tape, a driving capstan positioned with respect to said scanning assembly to effect driving contact with the tape in both the first and second levels with the tape passing in a loop around said scanning assembly and said capstan, a first guide mounted on said deck between said scanning assembly and said capstan for engaging the tape at the first level and imparting a twist thereto, a second guide mounted adjacent said scanning assembly between said scanning assembly and said first guide, a third guide positioned adjacent said scanning assembly and said second guide, said second and third guides being positioned to engage the tape as it approaches and as it leaves said scanning assembly to provide an Omega type wrap thereabout, a fourth guide positioned between said third guide and said capstan for engaging the tape at the second level and imparting a twist thereto, said first, second, third and fourth guides being positioned such that the tape passes between said first and fourth guides and between said second and third guides as it passes between said scanning assembly and said capstan, and transducing means positioned to engage the tape between said capstan and said first and fourth guides, said transducing means being disposed between the portion of tape between said capstan and said first guide and the portion of tape between said capstan and said fourth guide, whereby said guide cones serve to hold the tape against said transducing means.

15. A tape transport for use in magnetic tape recording or reproducing apparatus, including in combination, a tape deck, a scanning assembly mounted on said deck for storing information on magnetic tape or for reproducing information stored on magnetic tape, means for supplying magnetic tape to said scanning assembly and for taking up magnetic tape from said scanning assembly, lower edge guide means positioned adjacent said scanning assembly for engaging the lower edge of the magnetic tape as it approaches and leaves said scanning assembly to guide the tape in a helical path about said scanning assembly, a pair of arms pivotal between operating and thread positions, an entry guide secured to one of said arms and an exit guide secured to the other of said arms, each of said entry and exit guides being disposed adjacent the other and said scanning assembly in the operating position for guiding the tape about said scanning assembly in an Omega type wrap, each of said entry and exit guides being shaped to extend over said lower edge guide means to a position directly above same, and means for pivoting said arms away from each other and said scanning assembly and said lower edge guide means from the operating position to a thread position wherein said entry and exit guides are positioned to facilitate threading of tape around said scanning assembly and over said lower edge guide means.

16. The combination of claim 15 wherein said lower edge guide means comprise a pair of members secured to said tape deck adjacent said scanning assembly, each of said members having an inclined notch formed therein providing a guiding surface for the lower edge of the tape.

References Cited

UNITED STATES PATENTS 3,123,272 3/1964 Pollaschek -------- 179—100.2

BERNARD KONICK, *Primary Examiner.*

J. R. GOUDEAU, *Assistant Examiner.*